United States Patent

[11] 3,591,883

| [72] | Inventors | William H. Armstrong; Jack L. Ponkey, both of Birmingham, Mich. |
|---|---|---|
| [21] | Appl. No. | 805,584 |
| [22] | Filed | Mar. 10, 1969 |
| [45] | Patented | July 13, 1971 |
| [73] | Assignee | Yard-Man Incorporated Jackson, Mich. |

[54] TWO-STAGE LAWN SWEEPER
5 Claims, 3 Drawing Figs.

[52] U.S. Cl. ................................................ 15/79, 15/83, 56/27, 400.02
[51] Int. Cl. ............................................... E01h 1/04
[50] Field of Search .......................... 15/49 C, 79, 83, 340, 348; 56/27, 400.02, 400.03

[56] References Cited
UNITED STATES PATENTS

| 850,777 | 4/1907 | Mosher | 15/79 UX |
| 2,244,848 | 6/1941 | Olds et al. | 15/83 |
| 2,448,328 | 8/1948 | Russel | 15/83 |
| 3,084,363 | 4/1963 | Vetne | 15/79 |
| 3,222,706 | 12/1965 | Kaar et al. | 15/83 X |

FOREIGN PATENTS

| 454,105 | 1/1949 | Canada | 15/83 |
| 501,386 | 4/1920 | France | 15/83 |
| 1,623 | 1912 | Great Britain | 15/79 |
| 689,838 | 4/1965 | Italy | 15/79 |

Primary Examiner—Edward L. Roberts
Attorney—Beaman & Beaman

ABSTRACT: A sweeper of the type commonly known as a lawn sweeper utilizing a rotating pickup brush for removing leaves, grass cuttings and debris from a lawn, and throwing the matter swept from the lawn into an impeller, which in turn transfers the sweepings into a hopper. The resultant dual or two-stage transferral of the sweepings from the lawn to the hopper provides improved operating characteristics and improved distribution of the sweepings within the hopper.

PATENTED JUL 13 1971 3,591,883

INVENTORS
WILLIAM H. ARMSTRONG
JACK L. PONKEY

BY Beaman&Beaman

ATTORNEYS

3,591,883

TWO-STAGE LAWN SWEEPER

BACKGROUND OF THE INVENTION

The invention pertains to the field of sweeping devices utilizing a rotating brush member wherein the sweepings are transferred to a hopper.

Lawn sweepers are finding increased acceptance as standard lawn care equipment, and by the regular use of a lawn sweeper grass clippings, leaves and debris may be removed from the lawn before such matter works its way into the grass and becomes difficult to remove. Additionally, by regularly sweeping a lawn the health of the lawn can be maintained and the building up of grass clippings and leaves about the roots of the grass can be controlled.

Conventional lawn sweeping devices include an elongated rotary brush member driven from the ground wheels of the sweeper. As the sweeper is pushed, or driven, across the lawn the brush rotates, and the ends of the brush are related to the ground such that the brush will pick up foreign objects resting upon the lawn and deposit the same in a hopper usually located behind the brush with respect to the direction of sweeper movement. The sweepings picked up and thrown toward the hopper by the rotating brush follow a common path, and the sweepings tend to accumulate at one location within the hopper.

With conventional lawn sweeper constructions the distance that the brush is able to throw the sweepings, and the force of the throw, is limited due to constructional features, and the sweepings usually tend to accumulate within the hopper rather close to the opening defined between the sweeper chamber in which the brush is located and the hopper through which the sweepings pass. Thus, as the sweepings often tend to accumulate relatively close to the point at which they are introduced into the hopper an accumulation of sweepings occurs which interferes with depositing of the sweepings within the hopper causing clogging, and requiring the hopper to be emptied before its true capacity is reached. The resultant frequent hopper emptying, or the attendant manual redistribution of the sweepings within the hopper, are troublesome.

Additionally, conventional sweeper constructions will often become clogged upon the pickup brush encountering a heavy accumulation of leaves or debris, and the brush is unable to sufficiently clear itself to provide optimum transferral of the sweepings into the hopper resulting in the sweeper becoming inefficient or inoperative.

SUMMARY OF THE INVENTION

The invention utilizes a dual or two-stage system for transferring the matter being swept from the lawn to the hopper. This two-stage system permits the sweeping brush to immediately clear itself, and does not impose a significant "throwing" or transfer burden upon the brush, as is the case with conventional single stage sweepers. The rotating brush lifts the matter to be swept from the lawn into a rotating "second stage" impeller. The impeller is not in engagement with the lawn, and will normally be rotating at a rate faster than that of the brush. The impeller receives the lifted sweepings from the brush and forcibly throws the sweeping through an outlet defined in the impeller chamber into the hopper.

One of the prime advantages resulting from the use of the second stage impeller lies in the ability of the impeller to forcibly eject the sweepings into the hopper, which permits the sweepings to be thrown to a portion of the hopper remote from the point at which they were introduced therein. Thus, as the sweepings accumulate they do not interfere with the introduction of sweepings into the hopper and the hopper is ultimately able to receive its designed capacity of sweepings without requiring a manual distribution of the sweepings within the hopper.

By utilizing the second stage impeller the frictional and work loads imposed upon the sweeping brush are substantially reduced as compared with conventional single stage sweepers. In that the component for removing the sweepings from the lawn is different than the component for introducing the sweepings into the hopper a most effective design for each of these components can be achieved, without compromise. The impeller may be formed of synthetic plastic radially disposed paddle like elements capable of producing a "fan" action which aids in the forcible injecting of the sweepings into the hopper. Additionally, in that the impeller is rotating at a faster rate then the brush the capacity for handling sweepings is greater than the brush and the impeller is able to keep the brush from becoming overloaded, permitting the sweeper to effectively handle heavier loads than single stage sweepers of comparable size.

In the practice of the invention the sweeper includes a frame upon which a chamber is defined. A pair of parallel rotatably mounted shafts extend through the chamber transverse to the direction of movement of the sweeper. Brush elements are mounted upon one of the shafts, and impeller elements are mounted upon the other shaft. The brush shaft is preferably driven from a ground-engaging wheel supporting the sweeper frame, and the brush shaft is belted to the impeller shaft by a twisted belt whereby the brush and impeller rotate in opposite directions. Preferably, the chamber includes baffle means to provide optimum air flow characteristics adjacent the brush and impeller. The brush rotates in the opposite direction with respect to the path of movement of the sweeper and lifts sweepings from the lawn into the path of the impeller. The impeller throws the sweepings from an outlet defined in the chamber to a portion of the hopper remote from the chamber outlet.

The use of the two-stage sweeping system permits the hopper to be hinged to the sweeper frame at an upper region adjacent the chamber outlet whereby the sweeper hopper may be pivoted over the chamber to permit ready emptying of the hopper.

BRIEF DESCRIPTION OF THE DRAWING

The above objects of the invention, and the advantages derived therefrom, will be appreciated from the following description and accompanying drawings wherein.

DESCRIPTION OF THE PREFERRED EMBODIMENT

The inventive concept is disclosed in the form of a lawn sweeper adapted to be towed behind a lawn mower, lawn tractor or the like. Of course, the inventive concept can be utilized in lawn sweepers that are manually pushed or pulled across the lawn, and the disclosed embodiment illustrated is that of a commercial form of the invention.

The sweeper includes a frame generally indicated at 10, which is primarily comprised of sheet metal. The frame includes lateral sidewalls 12 and 14 disposed in spaced parallel relation and interconnected by an arcuate and sloping upper wall portion 16. The underside and "front" of the frame are preferably open, as will be appreciated in FIG. 2.

Figure 2:
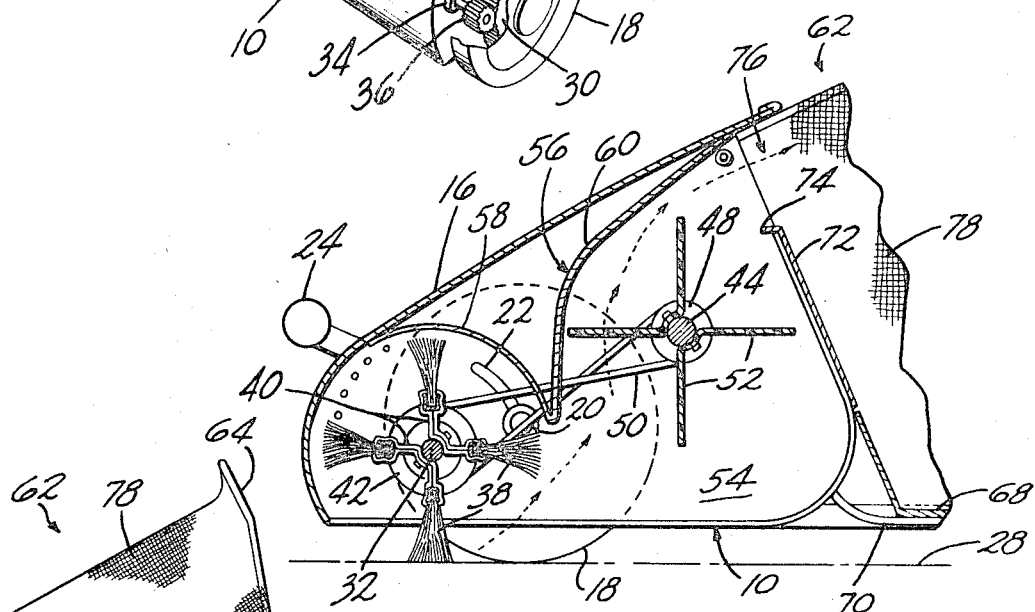
FIG. 2 is an enlarged, elevational, detail, sectional view taken through the brush and impeller chamber and frame along Section II–II of FIG. 1.

A pair of ground wheels 18 are mounted upon the lateral sidewalls 12 and 14 of the frame by adjusting means permitting the wheel stub axles 20, FIG. 2, to be vertically positioned within arcuate slots 22 defined in the sidewalls. The vertical position of the wheels 18 is adjusted by means of hand levers 24 which include detent means for being selectively received within one of a plurality of holes 26 defined in the adjacent sidewall. Adjustment of the levers 24 raises and lowers the wheel stub axles within the slot 22 thereby raising and lowering the frame relative to the ground level 28 as indicated in FIG. 2. The exact construction of the wheel adjustment is preferably similar to that shown in U.S. Pat. No. 3,178,874.

At least one of the wheels 18 is provided with a drive gear 30, FIG. 1, concentrically defined thereon for driving engagement with the brush shaft gear as will be later described.

A brush shaft 32 is rotatably mounted upon the frame 10 by means of bearings 34, FIG. 2. The shaft 32 extends across the width of the frame and includes an end, FIG. 1, which extends into the confines of the adjacent drive wheel and has a pinion gear 36 mounted thereon for meshing with the wheel gear 30. Four elongated brush elements 38 are mounted upon the shaft 32 by means of clamping elements 40, FIG. 2. Preferably, the brush bristles are molded within a plastic backing gripped by the elements 40, and in this manner the four brush elements will be disposed at 90° locations with respect to each other about the axis of the shaft 32.

Figure 1:
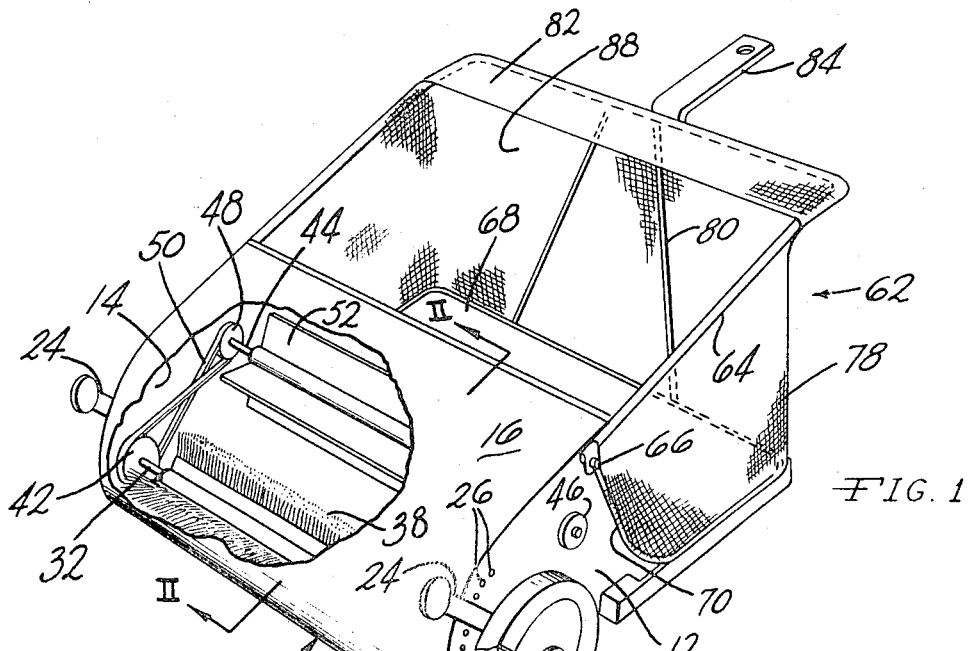
FIG. 1 is a perspective view of a sweeper embodiment of the invention, portions thereof being broken away for the purpose of illustration.

A pulley 42 is mounted upon the shaft 32 adjacent the sidewall 14, FIG. 1.

In spaced relation to the shaft 32 is an impeller shaft 44 which is rotatably mounted upon the frame sidewalls by bearings 46. The impeller shaft 44 is parallel to the brush shaft 32, and includes a pulley 48, preferably of a smaller diameter than the pulley 42. An endless belt 50 is reeved upon the pulleys 42 and 48, and the belt is twisted whereby the direction of rotation of the impeller shaft 44 will be opposite to that of the direction of rotation of the brush shaft 32.

A plurality of elongated paddle-type impellers 52 are mounted upon the shaft 44 by bolts. The impellers may be formed of a synthetic plastic sheet material having high resistance to impact, and may be formed of a V-configuration wherein two of the members form four radially extending paddles upon the impeller shaft extending substantially the length of the shaft.

The sidewalls 12 and 14 and the upper wall portion 16 define a chamber 54 in which the brush and impeller components are mounted. The brushes 38 and impellers 52 are divided by a baffle 56 having an arcuate portion 58 substantially concentric with the axis of rotation of the brush shaft 32, and the baffle portion 60 is disposed as to guide sweepings transported by the impellers through the chamber outlet into the hopper, as will be later described.

A large capacity hopper 62 for the sweepings is mounted upon the frame 10 for receiving the matter swept from the lawn by the brushes 38, and impelled into the hopper by the impeller paddles 52. The hopper 62 includes an upper U-shaped member 64 which is pivotally connected at its free ends to the upper region of the frame sidewalls by means of pivot bolts 66. The hopper bottom 68 may be formed of sheet metal and includes upwardly extending portion 72, FIG. 2, terminating in an inwardly deflecting lip 74. The upwardly extending portion 72 forms a wall intermediate the impeller portion of the chamber 54 and interior of the hopper wherein an outlet 76 from the chamber is defined between the lip 74 and the upper frame wall portion 16. The outer periphery of the hopper bottom 68 is provided with tubing 70 which connects to the pivots 66 at its ends. An open woven cloth 78 such as a fabric of polypropylene, is interposed between the upper hopper member 64 and bottom 68 thereof. The spacing between the hopper bottom and the upper member is maintained by a metal spacing element 80. A portion of the fabric 78 extends over a portion of hopper member 64 at 82 to insure that the sweepings are maintained within the hopper as they strike the wall of the hopper upon being ejected from the outlet 76.

The sweeper drawbar 84 is fixed to the lower region of the frame 10, and extends below the hopper bottom 68 and is upwardly bent as at 86 for attaching to the drawbar of the towing vehicle. The hopper 62 rests upon the lower horizontal portion of the drawbar and will therefore be maintained in operating position by the drawbar.

In operation, the vertical position of the sweeper frame is adjusted by positioning the wheel levers 24 as desired. The desired vertical position of the frame and brush shaft, will depend upon the type of sweeping to be done, the length of the grass, and the depth that it is desired that the brush penetrate the lawn. Once the desired height of the sweeper is achieved, the sweeper is merely towed about the lawn by the towing vehicle. The normal mode of use is to employ the sweeper behind a lawn mower and use simultaneously with the cutting of the grass, and in this manner the grass clippings will be removed from the lawn before they have a chance to settle into the grass roots.

The movement of the sweeper across the lawn, which will be toward the right, as viewed in FIG. 2 causes the brush shaft 32 to rotate in a counterclockwise direction, FIG. 2, due to the engagement of the gears 30 and 36. Simultaneously, the impeller shaft 44 will be driven in a clockwise direction due to the twisted belt 50.

The impeller shaft will rotate at a greater angular velocity than the brush shaft, in view of the difference in size of the pulleys 42 and 48, and leaves, grass clippings and debris engaged by the brushes 38 will be thrown upwardly into the chamber 54 toward the impeller paddles 52. The rapid rotation of the impeller causes the sweepings thrown toward the paddles to be forcibly ejected through the outlet 76 which defines a substantial tangential path with respect to the impeller paddles. The path of movement of debris lifted from the lawn surface 28 by the brushes 38 as transferred through the chamber 54 is illustrated by the arrows shown in FIG. 2.

In that the impeller shaft 44 may be located at a position substantially vertically higher than the brush shaft 32, and close to the outlet 76, the utilization of the impeller paddles permits the sweepings to be very forcibly and positively ejected from the outlet into the hopper. The force with which the sweepings are introduced into the hopper causes the sweepings to strike the hopper wall 88 and fall to the hopper bottom adjacent the wall. In this manner the sweepings tend to accumulate at that point in the hopper furtherest from the outlet 76 assuring that the accumulation of sweepings does not hinder introduction of the sweepings into the hopper as the hopper fills.

The impeller 52 has a greater capacity for handling sweepings than the brush 38, and thus any tendency for the brush to become clogged is minimized.

Figure 3:
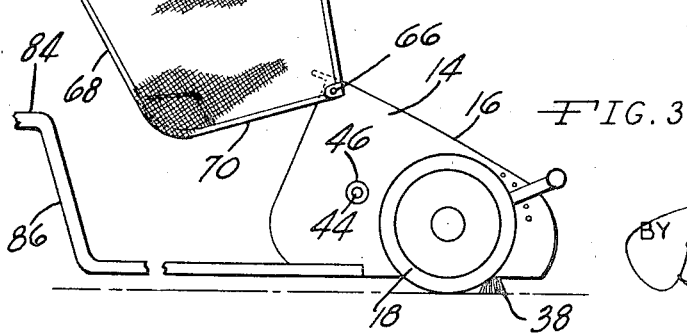
FIG. 3 is a side, elevational view illustrating the position of the hopper during emptying thereof.

When it is desired to empty the hopper the hopper is pivoted over the frame 10 on the pivots 66 in the manner which will be apparent from FIG. 3. The sweepings will therefore be deposited at the rear of the sweeper, and a portion thereof will fall upon the sweeper wall portion 16 where they will slide to the ground due to the oblique configuration of the wall portion 16. As the usual mode of operation will be for the lawn sweeper to be "backed" to the desired position that the hopper is to be dumped this method of emptying the hopper lends itself to a towed sweeper.

Of course, it is appreciated that it is possible to separately drive the brush and impeller shafts, and if a drive motor is to be used with a sweeper of this type the use of separate drive connections for the brush and impeller shafts is considered to be within the scope of one skilled in the art. Likewise, those modifications which would permit the inventive concept utilizing the dual stage transfer of sweepings to be used with a manually pushed embodiment, which would have a direction of sweeping movement toward the left, FIG. 1, is considered to be within the skill of one skilled in the art.

We claim:

1. A lawn sweeper comprising, in combination, a supporting frame, ground wheels rotatably mounted upon said frame, a hopper defined on said frame having a bottom and a debris retaining wall extending upwardly from said bottom terminating in an upper edge, an inlet defined in said hopper adjacent and above said upper edge, a extending defined on said supporting frame having a portion extending adjacent and above said upper edge defining an outlet communicating with said hopper inlet, said hopper retaining wall being disposed toward said chamber, a rotary sweeper brush rotatably mounted on said frame within said chamber rotatable in a direction to lift debris from the ground into said chamber, a rotatable impeller mounted within said chamber intermediate said brush and said chamber outlet immediately below said chamber portion and adjacent said outlet receiving debris lifted by said brush into said chamber, a baffle defined within said chamber adjacent and above said impeller and substantially tangential to the path of movement of said impeller extending to said chamber portion adjacent said outlet, drive means connected to said brush and impeller rotating said impeller in a direction opposite to that of said brush and in a direction to translate debris received from said brush substantially parallel to said baffle, over said impeller, through said outlet into said hopper.

2. In a lawn sweeper as in claim 1 wherein said sweeper brush includes brush elements having bristles and said impeller includes paddles radially extending from the impeller axis of rotation.

3. In a lawn sweeper as in claim 1 wherein said chamber includes an upper portion said outlet being defined in said upper portion, and pivot means connecting said hopper to said frame adjacent said chamber outlet whereby said hopper may be pivoted over said frame and chamber to empty said hopper.

4. In a lawn sweeper as in claim 1 wherein said impeller is located vertically higher than said brush and receives debris from said brush and discharges such debris through said outlet in less than one half of a revolution of said impeller wherein the direction of movement of debris pick up by said brush is only slightly altered by said impeller.

5. In a lawn sweeper as in claim 1 wherein said drive means includes a first shaft supporting said brush and a second shaft supporting said impeller, a pulley mounted upon each of said shafts and a twisted endless belt mounted upon and interconnecting said pulleys.

UNITED STATES PATENT OFFICE
CERTIFICATE OF CORRECTION

Patent No. 3,591,883               Dated July 13, 1971

Inventor(s) William H. Armstrong and Jack L. Ponkey

It is certified that error appears in the above-identified patent and that said Letters Patent are hereby corrected as shown below:

Column 4, line 71, delete "extending" and substitute -- chamber --

Column 6, line 2, after "portion" insert -- , --

Signed and sealed this 4th day of January 1972.

(SEAL)
Attest:

EDWARD M. FLETCHER, JR.          ROBERT GOTTSCHALK
Attesting Officer               Acting Commissioner of Patents